Oct. 28, 1924.

W. R. MOYER 1,513,414

VEHICLE SIGNAL

Filed June 10, 1921

Inventor
W. R. Moyer

By Edson Bros,

Attorneys

Oct. 28, 1924.
W. R. MOYER
1,513,414
VEHICLE SIGNAL
Filed June 10, 1921    2 Sheets-Sheet 2
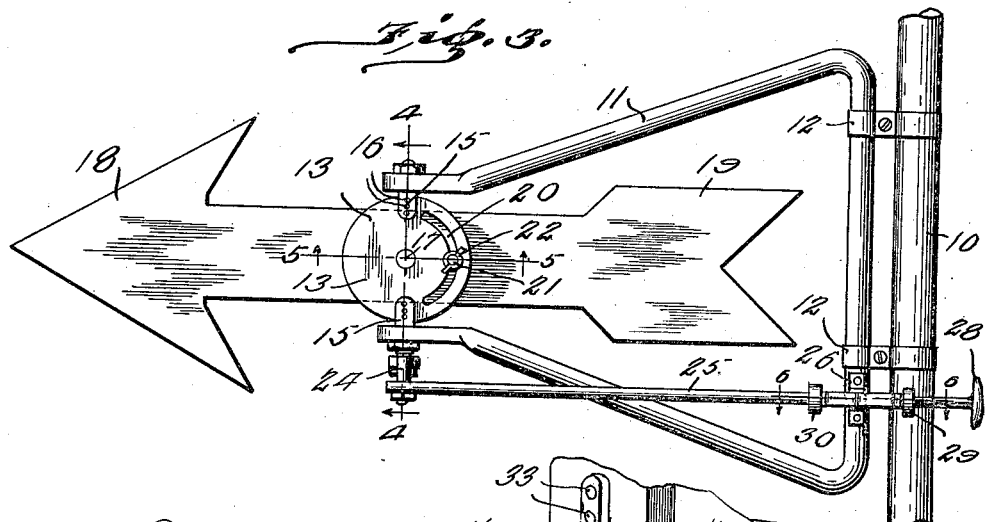
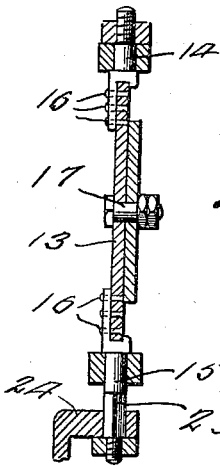
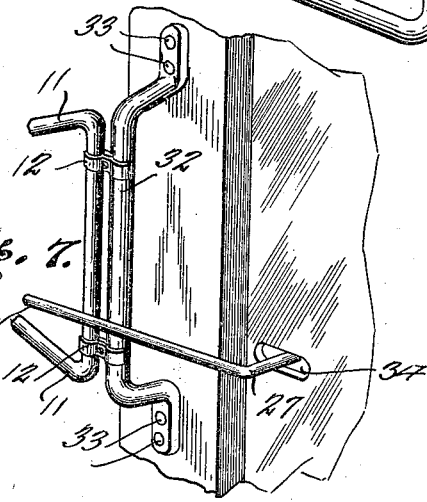
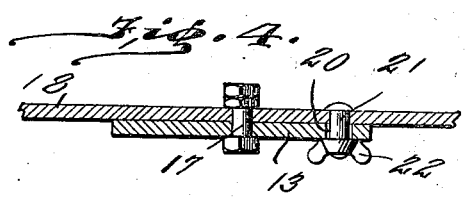
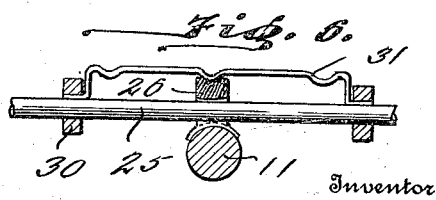
Inventor
W. R. Moyer
By Edson Bros
Attorneys Patented Oct. 28, 1924.

1,513,414

UNITED STATES PATENT OFFICE.

WILLARD R. MOYER, OF GADSDEN, ALABAMA.

VEHICLE SIGNAL.

Application filed June 10, 1921. Serial No. 476,520.

*To all whom it may concern:*

Be it known that I, WILLARD R. MOYER, a citizen of the United States, residing at Gadsden, 1327 Hill Ave., in the county of Etowah and State of Alabama, have invented certain new and useful Improvements in Vehicle Signals, of which the following is a specification.

This invention relates to vehicle signals and has for an object to provide a signal of improved type to be attached to and operated upon a vehicle to indicate in advance the proposed direction of travel.

A further object of the invention is to provide an index having opposite ends easily distinguishable which may be rotated upon a vertical axis by improved manual means to indicate to the observer the proposed direction by the position of the index.

A further object of the invention is to provide a frame which is attached to some part of a vehicle, as for instance, the wind shield or its supporting structure, with a rotatable index mounted upon the frame and means extending into position for easy access by the operator for conveniently changing the position of the index for the purpose of indicating, as above noted.

With these and other objects in view the invention comprises certain novel units, elements, parts, combinations, functions and mechanical movements, as disclosed in the drawing, together with mechanical equivalents thereof, as will be hereinafter more fully described and claimed.

In the drawings:

Fig. 3 is a view of the signaling device in side elevation.

Fig. 4 is a sectional view through the pivot of the index taken on line 4—4 of Fig. 3.

Fig. 5 is a sectional view longitudinally and axially through the index taken on line 5—5 of Fig. 3.

Fig. 6 is a sectional detailed view of the restraining means taken on line 6—6 of Fig. 3.

Fig. 7 is a detailed fragmental perspective view showing a modification of the attaching means.

Figure 1:
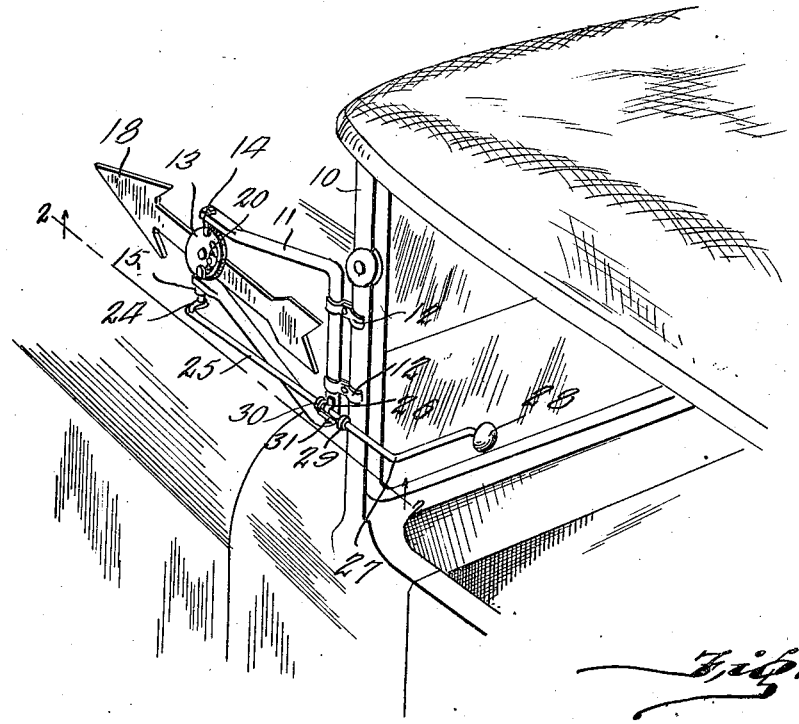
Fig. 1 is a perspective view of a conventional motor vehicle with the signal attached thereto.
Figure 2:
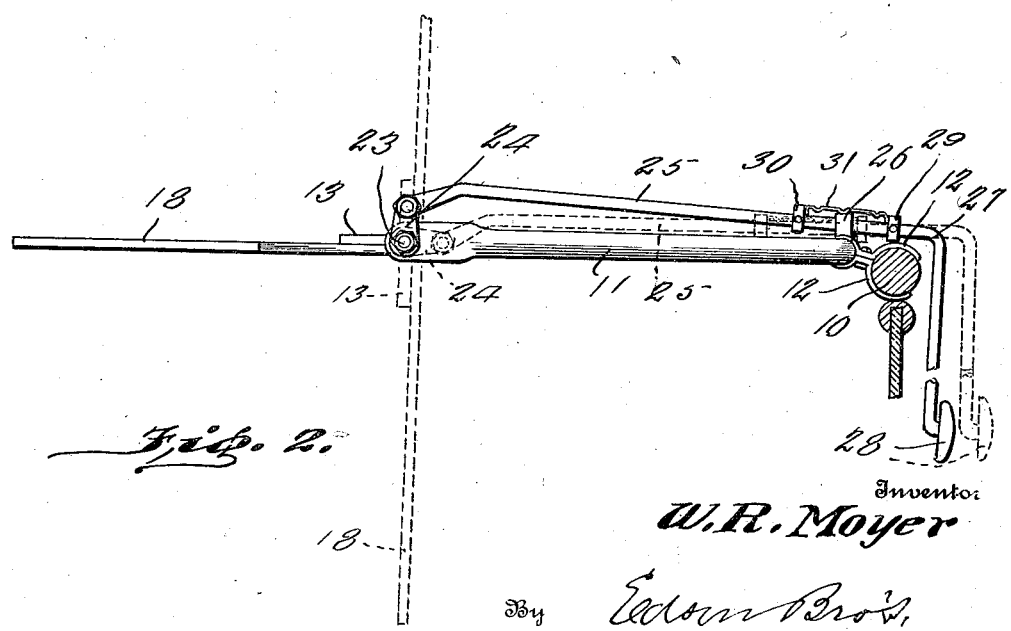
Fig. 2 is an inverted plan view of the signaling apparatus showing a fragment of the vehicle structure in a section.

The improved signal, which forms the subject matter of this application, is adapted to be used with a variety of vehicles, but more especially with the vehicle at present known as the automobile and shown conventionally in Fig. 1.

Such a vehicle comprises a frame member 10 which may be a part of the wind shield of analogous structure and thereto is attached the framework of the invention indicated at 11, substantially triangular in form. This frame 11 is attached to the vehicle in any approved manner, as by the clamping means 12, so that the plane of the frame 11 is substantially vertical and preferably parallel with the line of travel of the vehicle.

Between the extremities of the triangular frame 11 a plate 13 is journaled in any approved manner, as by attaching trunnions 14 and 15 thereto, as by the rivets 16. This plate 13 is provided with a central opening through which extends a pivot 17 and an index is attached to the plate by the pivot bolt. This index may be of any preferred or desired form to indicate the direction of travel of the vehicle, as hereinafter explained. As shown in the drawing, the index is in the form of a conventional arrow having a "head" 18 and a "tail" 19. Also preferably, though not necessarily, the head and tail of this index will be differently colored. The manner of attaching to the plate 13, in addition to the pivot bolt 17, is by means of segmental slot 20 formed in the plate with a bolt 21 and winged nut 22 for exerting tension upon the bolt so that the index may be varied as to inclination relative to the plate 13 and incidentally to the frame 11 and a horizontal plane.

The trunnion 15 is provided with an angular or squared portion 23 upon which is rigidly secured an arm 24 preferably extending substantially at right angles to the plane of the index. To this arm 24 a rod 25 is pivoted extending rearwardly through a keeper 26 rigidly attached to the frame 11 and bent as at 27 so that the extremity, to which may be attached a knob 28, is located within the lines of the vehicle and in position to be easily grasped by the operator.

Specifically as attached to the type of vehicle shown in Fig. 1, this bend will bring the knob 28 well within the lines of the vehicle and slightly in the rear of the wind shield.

Rigidly, but adjustably attached to the rod 25, are collars 29 and 30 and a spring 31 is preferably attached by having its extremities inserted between the collars 29 and 30 and the rod 25. This spring 31 is provided with bends which engage the keeper 26 so that the position of the rod in longitudinal relation to the keeper will be maintained automatically until manually changed.

For vehicles which provide no wind shield frame, as for instance, the type of vehicle now known as the closed body type, a brace 32 is provided which is attached to the side of the vehicle at 33 and, with a small opening 34 through the side of the body the knob 28 will be available within for convenient operation.

As shown in full line in the drawings, the index is intended to indicate that the vehicle will proceed straight ahead. This indication is apparent from the fact that the head of the arrow points in the direction of the longitude of the vehicle. This position will be the normal driving position of the index. When the vehicle is to turn to the left at the next turning the operator will pull on the handle 28, which will serve to turn the index so that the head will point to the left of the machine and will thereby indicate to any observer that a turn to the left is proposed. When the turn has been made or abandoned the index will be restored to the straight-ahead-position. When a turn to the right is to be made the operator will push upon the knob 28 which will turn the index in such position that the head will point to the right. In each instance, of course, the entire index will be apparent from the front of the machine, but at certain positions of the rear only such portion as extends beyond the line of the vehicle will be apparent. As when a turn is to be made to the right the tail of the arrow is thus made visible it will, of course, make it apparent to the observer who sees only that portion of the index that a turn is to be made to the right. The symbol of the index can, of course, be changed at will, but the symbol of an arrow for indicating the direction of travel will require no education on the part of the public to fully understand this symbol even though not all of the arrow will be visible to the observer. In other words, if the observer sees only the head or tail of the arrow the symbol is so well known that the direction of travel will at once manifest itself.

I claim:

A vehicle signal comprising a frame having spaced extremities, means to attach the frame to the side of a vehicle with the spaced extremities extending forwardly, a plate journaled within the frame to rotate upon a vertical axis, an index pivoted between its ends to the plate and adapted to rotate in a horizontal plane, said index also being adapted to rotate in a vertical plane, a crank arm carried by the journalling of the plate, a rod extending from the crank arm rearwardly beyond the limits of the frame, a keeper carried by the frame through which said rod extends, and a longitudinally extending spring mounted on said rod and having bends to engage the keeper.

In testimony whereof I affix my signature.

WILLARD R. MOYER.